(12) United States Patent
Chen et al.

(10) Patent No.: US 6,883,055 B2
(45) Date of Patent: Apr. 19, 2005

(54) HOT SWAP METHOD

(75) Inventors: Nai-Chi Chen, Hsinchu (TW); Chen-Tai Wang, Miaoli (TW)

(73) Assignee: Accton Technology Corporation, Hsinchu (TW)

( * ) Notice: Subject to any disclaimer, the term of this patent is extended or adjusted under 35 U.S.C. 154(b) by 389 days.

(21) Appl. No.: 10/150,148

(22) Filed: May 20, 2002

(65) Prior Publication Data

US 2003/0131170 A1 Jul. 10, 2003

(30) Foreign Application Priority Data

Jan. 10, 2002 (TW) .......................... 91100228 A (51) Int. Cl.$^7$ ............................................. G06F 13/00
(52) U.S. Cl. ...................................... 710/302; 710/104
(58) Field of Search ................................ 710/302, 301, 710/104, 8, 10, 16; 370/360, 362; 714/24

(56) References Cited

U.S. PATENT DOCUMENTS

| 5,579,491 A | | 11/1996 | Jeffries et al. |
| H1940 H | * | 2/2001 | Lohn, III .................... 370/216 |
| 6,763,417 B1 | * | 7/2004 | Paul et al. ................... 710/316 |
| 2002/0078290 A1 | * | 6/2002 | Derrico et al. .............. 710/302 |

* cited by examiner

Primary Examiner—Glenn A. Auve
(74) Attorney, Agent, or Firm—Birch, Stewart, Kolasch & Birch, LLP (57) ABSTRACT

A hot swap method for a switch. The switch includes plural slots and an agent module including a first link module coupled to the plural slots is disclosed. When a switch module having a second link module is inserted into the plural slots, the agent module generates an interrupt signal and a reset signal to initialize the switch circuit module. The agent module records an identification number of the second circuit module in a link table stored in the agent module. The link table stored in the agent module is generated by a topology discovery process. The switch module records an identification number of the agent module stored in the switch module. When the switch module is about to be removed, a release button of the switch module is pressed and an interrupt signal is generated by the agent module. The agent module disables communication function of the switch module. The agent module detects that data of the switch module is completely transmitted. The agent module removes the identification number of the switch module from the link table stored in the agent module. A LED of the switch module is turned on to show that the switch module is new removable.

14 Claims, 8 Drawing Sheets

| Link Port | Device ID |
|---|---|
| 1 | ID22, ID23 |
| ... | |
| 12 | ID41 |

| Link Port | Device ID |
|---|---|
| 1 | ID41 |
| 2 | ID22 |
| 3 | ID23 |

| Link Port | Device ID |
|---|---|
| 1 | ID22, ID23 |
| ... | |
| 8 | |

| Link Port | Device ID |
|---|---|
| 1 | ID41 |
| 2 | |
| 3 | ID23 |

FIG. 6D

| Link Port | Device ID |
|---|---|
| 1 | ID41 |
| 2 | ID22 |
| 3 | |

| Link Port | Device ID |
|---|---|
| 1 | |
| ⋮ | |
| 12 | ID41 |

FIG. 8A

| Link Port | Device ID |
|---|---|
| 1 | |
| ⋮ | |
| 8 | |

FIG. 8B

HOT SWAP METHOD

BACKGROUND OF THE INVENTION

1. Field of the Invention

The present invention relates to a hot swap method, and particularly to a hot swap method for a switch.

2. Description of the Related Art

Management and maintenance of a network system usually need to replace or upgrade many failed devices such as modules, adapter cards, and hard disk drives to provide reliable transmission of data and extension of more functions. When the network system is shut down to replace or upgrade devices, the network system is disconnected for a long time and the transmission efficiency of the network is reduced. After devices are installed or reconnected, the network system can be reboot. Thus, hot swap design is very important in a switch. Hot swapping is a useful function for inserting hard disk drives, adapter cards, and others into a system, and removing a device from the system when the system is powered up. Hot swapping saves time for shutdown and rebooting. It is very useful in managing and maintaining a network system. There are many logic circuits and interface cards electrically connected together in a typical network system. Were it not for hot swapping, it would take much time to save the status data of the network system in order to shut down the network system. Similarly, it also takes much time to assert the initial value of the network system. For example, when a switch is shut down to replace a switch module, the network is disconnected for a long time and the transmission efficiency of the network is reduced. Thus, hot swap design is very important in a switch.

Figure 1:
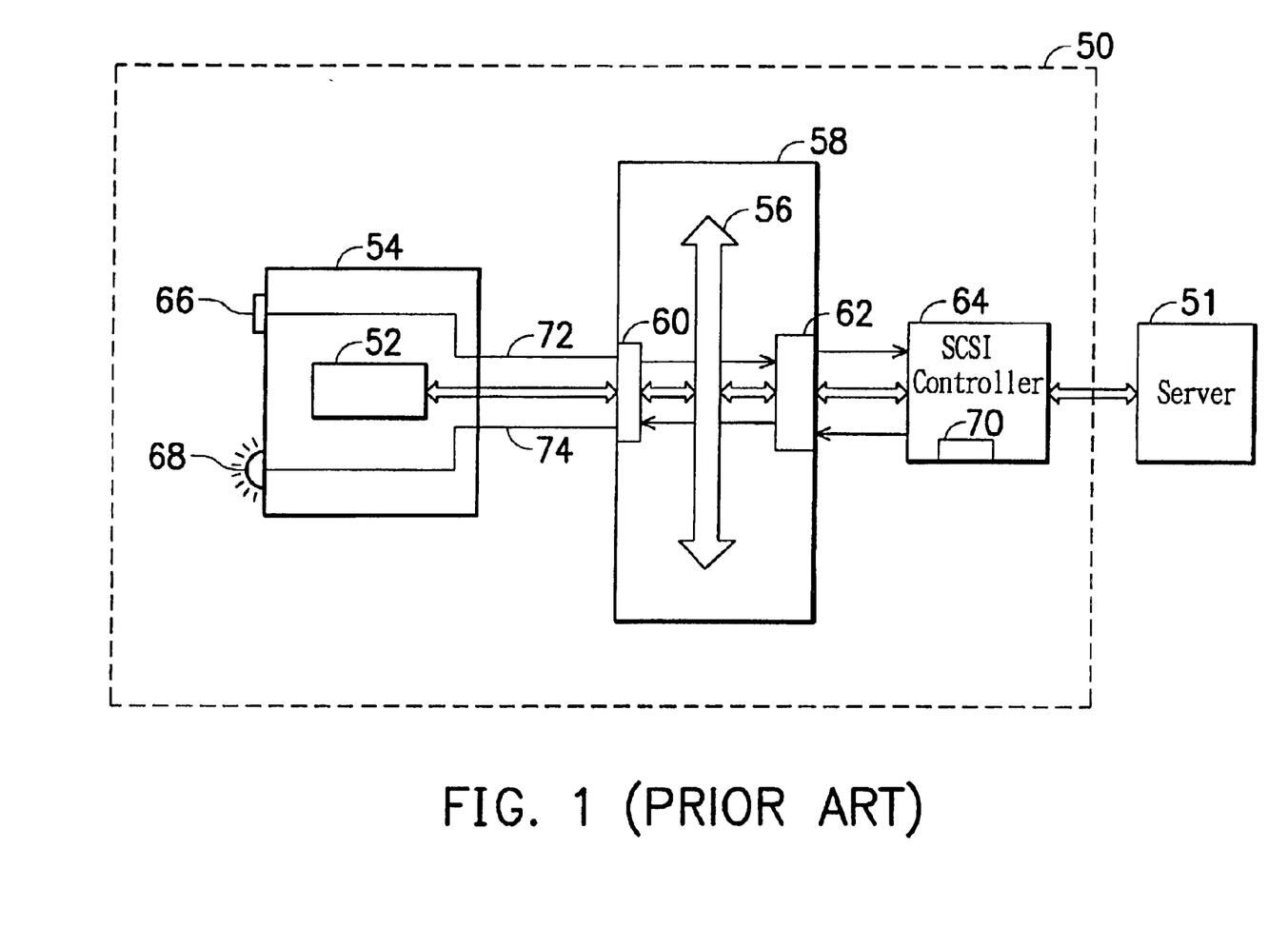
FIG. 1 illustrates a conventional hot swap computer system.

There are many methods for realizing hot swap network systems in prior art. For example, A hot-swap adapter card is disclosed in U.S. Pat. No. 5,579,491. FIG. 1 illustrates a conventional hot swap computer system. Computer system 50 includes a SCSI drive 52 contained within a mechanical drive carrier 54. The SCSI drive 52 is connectable to a SCSI bus 56, located on SCSI backplane 58, via special complementary connector (not shown) mounted on carrier 54 and device bay 60. The SCSI bus 56 is further connected to the server 51 via a backplane controller 62 and a SCSI controller 64.

Figure 2:
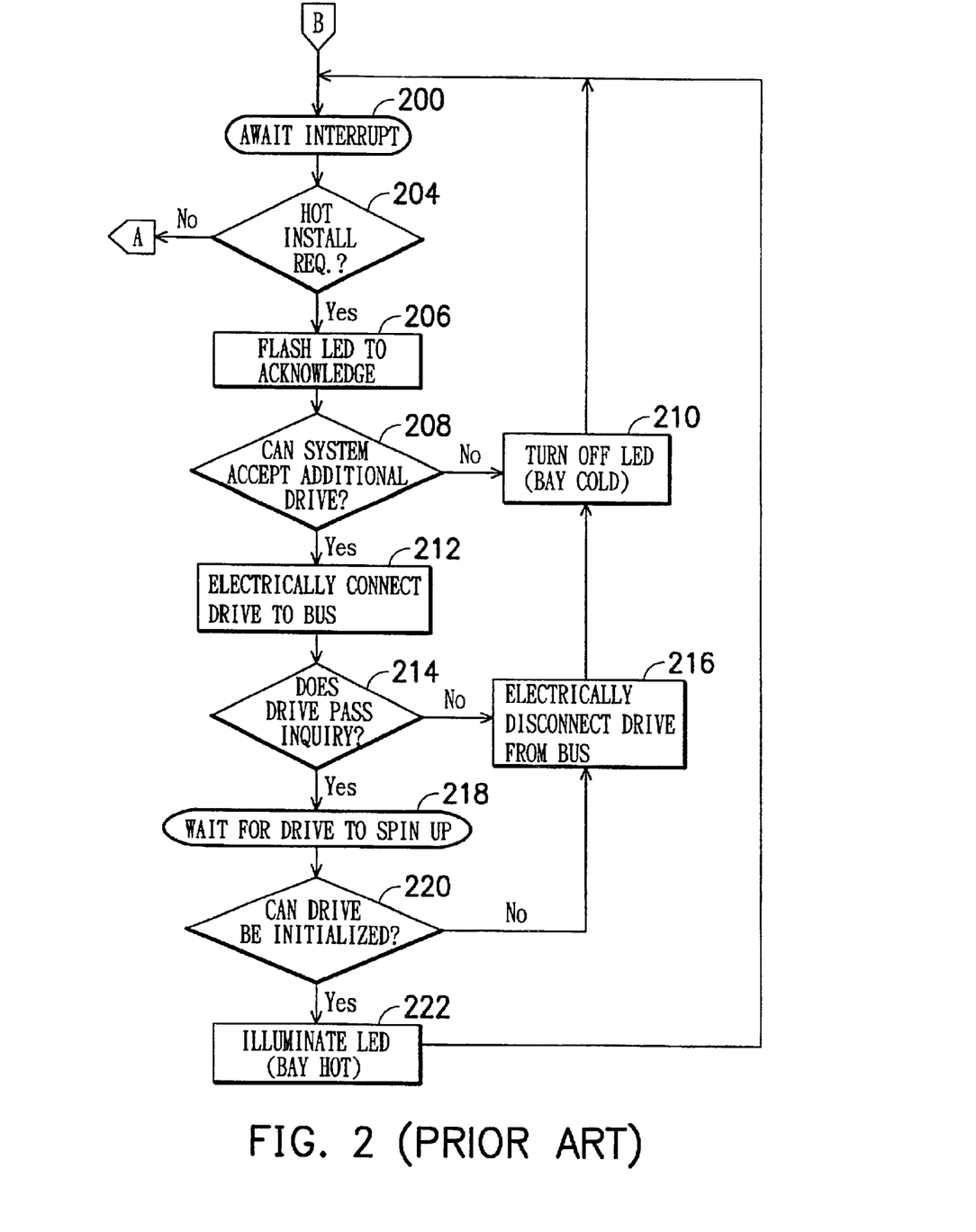
FIG. 2 is a flowchart of control logic implemented by the SCSI controller 64 for performing hot installation.

When a user wants to install the SCSI drive 52 onto the SCSI bus 56 while the SCSI bus 56 is active, the user first connects the drive carrier 54 to the device bay 60 on the backplane 58 to physically connect the SCSI drive 52 to the SCSI bus 56 and then depress the button 66 on the front panel of the drive carrier 54. Depression of the button 66 generates a hot install request, in the form of an interrupt signal, to the SCSI controller 64. Responsive to receipt of the hot install request, under the control of control logic 70, the SCSI controller 64 generates an acknowledge signal to the drive carrier 54, causing the LED 68 to flash on and off. FIG. 2 is a flowchart of control logic implemented by the SCSI controller 64 for performing hot installation. In step 200, the SCSI controller 64 awaits receipt of an interrupt form from the drive carrier 54. As previously discussed, such an interrupt is generated when the button 66 is depressed to initiate a hot install/remove request. In step 204, in which a determination is made whether the interrupt is a hot install request. If the interrupt is not a hot install request, i.e., it is a hot removal request, execution proceeds to hot removal steps (not shown). Otherwise, execution proceeds to step 206, in which a signal is generated to the drive carrier 54 to cause the LED 68 to flash on and off to acknowledge receipt of the hot install request. In step 208, a determination is made whether the computer system 50 can accept an additional drive at the present time. If not, execution proceeds to step 210, in which the SCSI controller 64 turns the LED 68 off and the device bay 60 remains cold, and the system then returns to step 200 to await additional interrupts. If the system 50 is performing routine maintenance or diagnostic procedure, for example, it may be prevented from being able to accept an additional drive.

If in step 208 it is determined that the system is capable of accepting an additional drive, execution proceeds to step 212, in which the SCSI drive is electrically connected to the SCSI bus 56. In step 214, a determination is made whether the SCSI drive 52 passes inquiry by the SCSI controller 64. Such inquiry typically includes at least a determination by the SCSI controller 64 as to the physical parameters of the SCSI drive 52. If in step 214 it is determined that the SCSI drive 52 does not pass inquiry, execution proceeds to step 216, in which the SCSI drive 52 is electrically disconnected from the bus, and then to step 210, in which the LED 28 is turned off, indicating that the device bay 60 is cold. Finally, execution returns to step 200. If in step 214 it is determined that the SCSI drive 52 does pass inquiry, execution proceeds to step 218, in which the SCSI controller 64 waits for the SCSI drive 52 to spin up and then to step 220, in which a determination is made whether the SCSI drive 52 can be initialized. If in step 220 it is determined that the SCSI drive 52 can be initialized, execution proceeds to step 222, in which the SCSI controller 64 changes the LED 68 from a flashing state to a continuous on state, indicating that the device bay 60 is hot, and the SCSI driver 52 is installed on the active SCSI bus 56. Execution then returns to step 200.

The conventional hot swap method does not disclose a scheme for a device to be inserted or removed from an active computer system, which includes a hierachical system. In a hierachical system, a link between a device and the hierachical system must be set up for adding a device, and a link between a device and the hierachical system must be dismissed for removal of a device. It is necessary to provide a hot swap method to add or remove a device in a hierachical computer system.

SUMMARY OF THE INVENTION

It is therefore an object of the present invention to provide a hot swap method to increase system flexibility and to increase system reliability.

To achieve the above objects, the present invention provides a hot swap method. According to the embodiment of the invention, a hot swap method for a computer system, which includes plural slots and an agent module including a first link module coupled to the plural slots. When a switch module having a second link module is inserted into the plural slots, the agent module generates an interrupt signal and a reset signal to initialize the switch module.

The agent module conducts a topology discovery process to generate a first link table recording an identification number of the switch module stored in the agent module.

The switch module conducts a topology discovery process to generate a second link table recording an identification number of the first circuit module stored in the switch module.

When the switch module is to be removed from the slots, a release button of the second circuit module is pressed and an interrupt signal is generated by the agent module.

The agent module disables packet transmission on the switch module. The agent module polls the status register of the switch module until queues are empty.

The agent module removes the identification number of the switch module from the first link table.

An LED of the switch module is turned on to show that the switch module is allowed to remove.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE INVENTION

Figure 3:
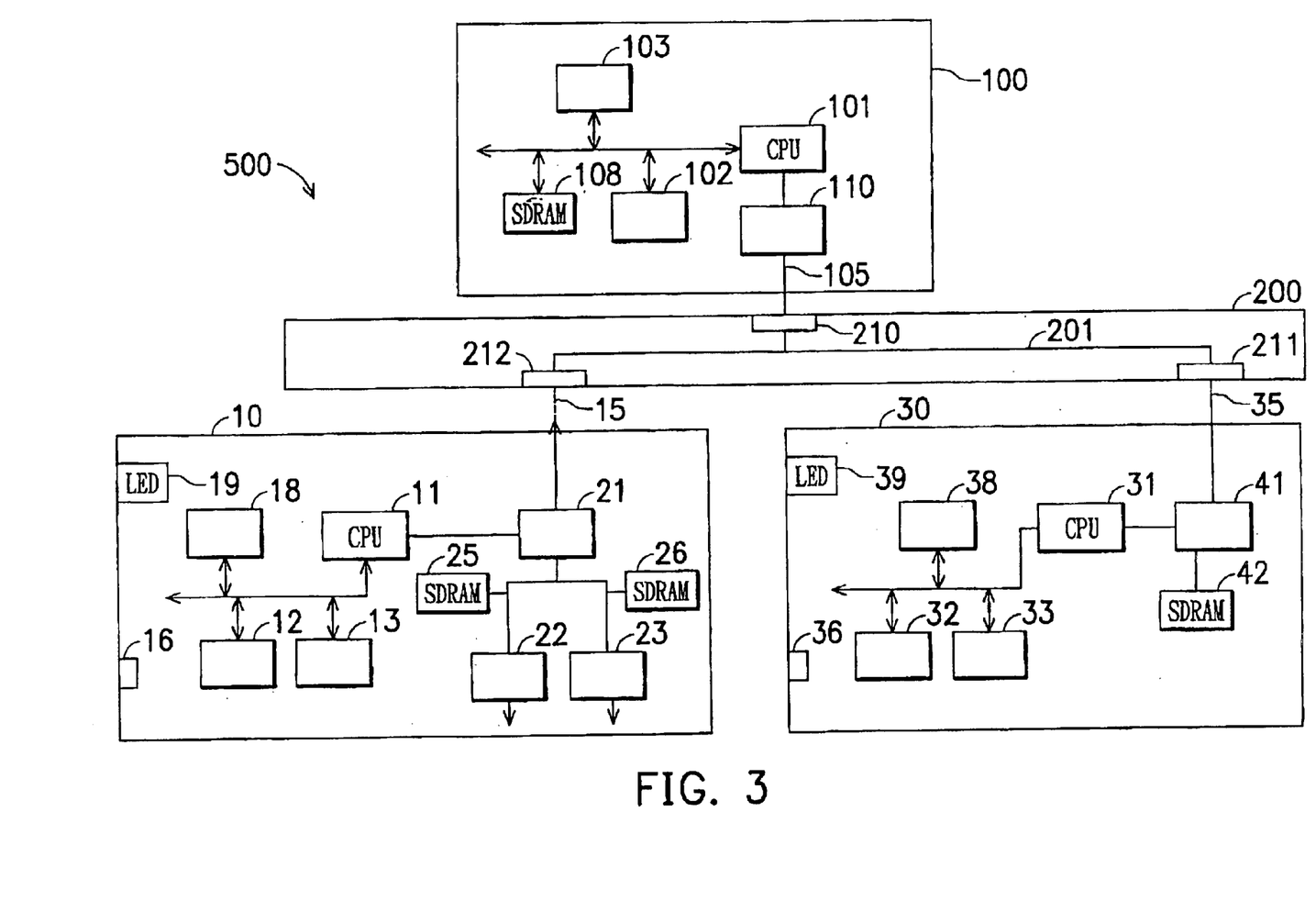
FIG. 3 illustrates a function block diagram of a switch according to the embodiment of the present invention.

FIG. 3 illustrates a function block diagram of a switch according to the embodiment of the present invention. The switch includes a agent module 100, a switch module 10, a switch module 30, and a backplane 200. The backplane 200 includes the slots 210, 211, 212 and a backplane bus 201. The switch module 10 is coupled to the backplane bus 201 via a bus 15 and the slot 212. The switch module 30 is coupled to the backplane bus 201 via a bus 35 and the slot 211. The agent module 100 is coupled to the backplane bus 201 via a bus 105 and the slot 210.

Figure 4:
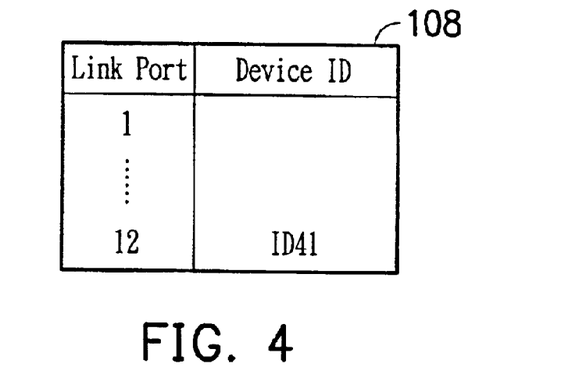
FIG. 4 shows the device table of the link port of the agent module 100.

The agent module 100 includes a CPU 101, a flash-ROM 103, a memory 102, and a memory 108. The flash-ROM 103 stores self-test program. The memory 102 can be an electrically erasable programmable ROM (EEPROM), which stores the configuration of the switch such as ID and assertion data of the modules. The memory 108 can be a synchronous dynamic RAM (SDRAM). FIG. 4 shows the device table of the link port of the agent module 100. The device table stores the link port of the slot 210 and the device ID. The device table is stored in the memory 108. The switch module 10 is not inserted into the backplane 200, 50 only ID41, the ID of the GT (Gigabit Transceiver) module 41, is recorded in the device table.

The switch module 10 includes a CPU 11, a memory 12, a memory 18, an erasable programmable logic device EPLD 13, a LED 19, a GT module 21, 22, and 23. The GT module 21 is coupled to the GT module 22 and 23. The LED 19 is for displaying the operation states of the switch module 10. The CPU 11 co-works with the CPU 101 to build up the topology of the switch 500. The communication channel between the agent module 100 and the switch module 10 or 30 is an UART channel. The CPU 11 receives the command from the agent module 100 and acts accordingly. At the same time CPU 11 collects data for managing LED properly. The EPLD 13 stores the slot ID mapping and the status register of the GT module 21. The memory 12 can be an EEPROM, storing the configurations of the switch 500 and switch module 10. The configuration is loaded by the user's interface. The memory 18 can be SRAM. The similar structure is applied to the switch module 30.

Figure 5:
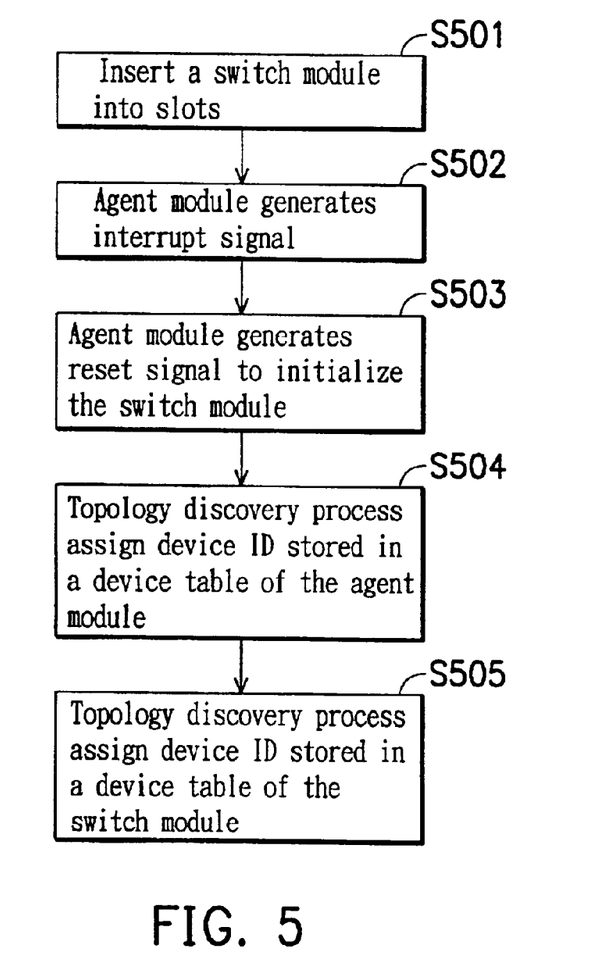
FIG. 5 shows the flow chart of a hot insertion of the switch.

FIG. 5 shows the flow chart of a hot insertion of the switch.

Figure 6A:
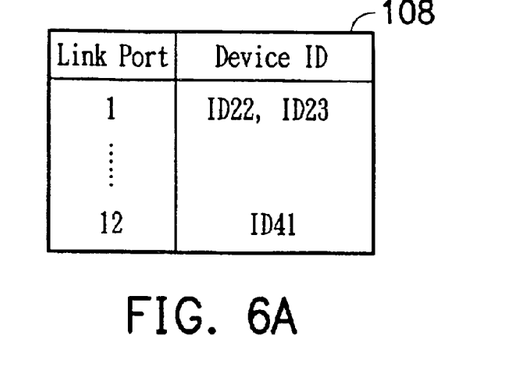
FIGS. 6A–6E shows the link table of adding the switch module.

In step S501, the switch module 10 is inserted in the slot 212, then the topology of the switch 500 is changed. A cross bar reset is necessary for the switch 500 to load the configuration to initialize the switch module 10. In step S502, the agent module 100 detects a new device inserted into the backplane 200. The CPU 101 generates an interrupt signal. In step S503, The CPU 101 generates a reset signal to the CPU 11 through the bus 105 and the backplane bus 201. The CPU 11 resets the switch module 10. The CPU 11 can be 8051. In step S504, The CPU 101 reads a program stored in the memory 103, then proceeds a topology discovery process to assign new IDs to the link ports of the switch module 10 and the switch module 30 and to generate a new device table, as shown in FIG. 6A. The device table in FIG. 6A stored in the memory 108, includes the link ports of the GT module 110 and the ID's of the devices coupled to the GT module 110.

Figure 6B:
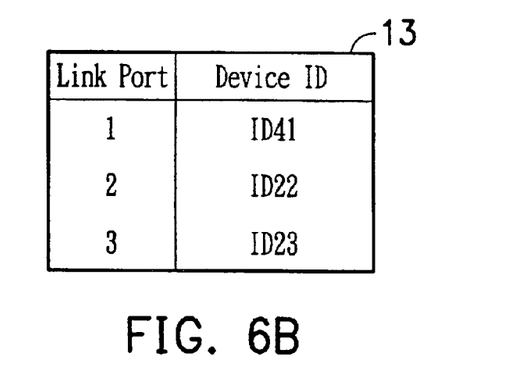
Figure 6C:
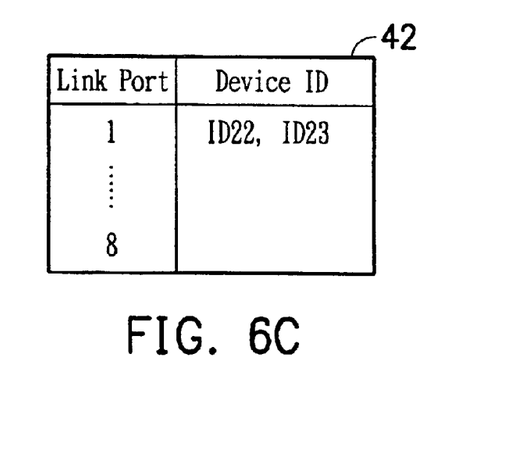
Figure 6D:
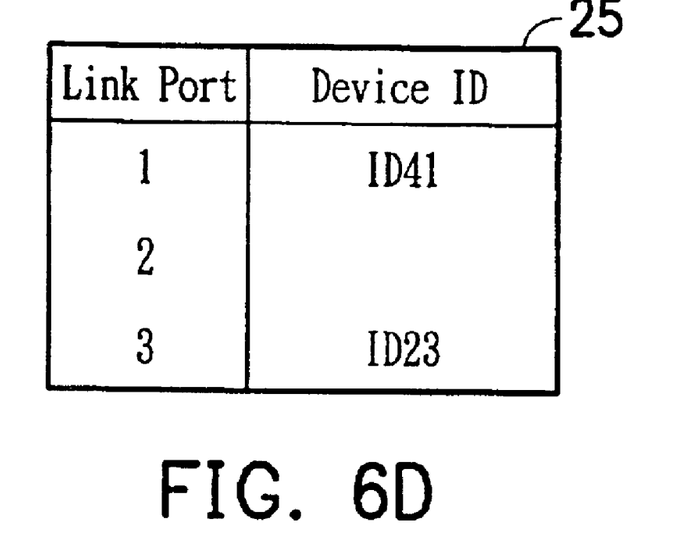
Figure 6E:
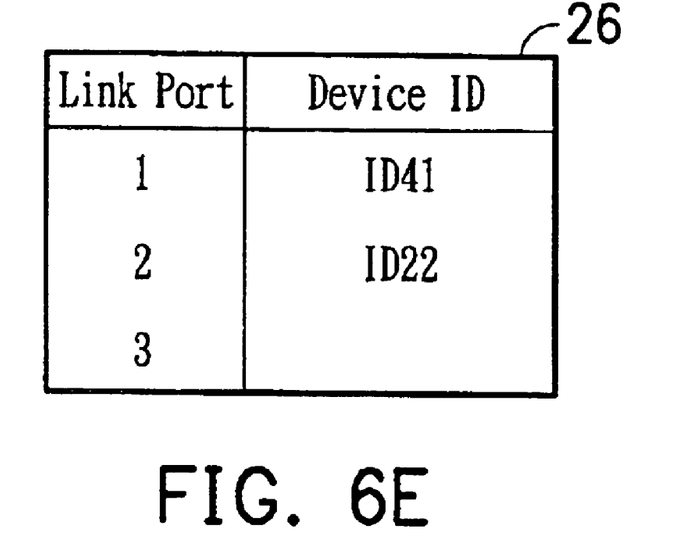

In step S505, the CPU 11 receives commands from the CPU 101, and adds the ID of the GT module 41, ID41, the ID of the GT module 22, ID22, and the ID of the GT module 23, ID23, to the device table of the GT module 21. The device table of the GT module 21 stored in the EPLD 13 is shown in FIG. 6B. The CPU 11 receives commands from the CPU 101, and adds the ID of the GT module 41, ID41, to the device table of the GT module 22. The device table of the GT module 22 stored in the memory 25 is shown in FIG. 6C. The CPU 11 receives commands from the CPU 101, and adds the ID of the GT module 41, ID41, to the device table of the GT module 23. The device table of the GT module 23 stored in the memory 25 is shown in FIG. 6D. The CPU 31 receives commands from the CPU 101, and adds the ID of the GT module 22, ID22, and the ID of the GT module 23, ID23, to the device table of the GT module 41. The device table of the GT module 41 stored in the memory 33 is shown in FIG. 6E.

Figure 7:
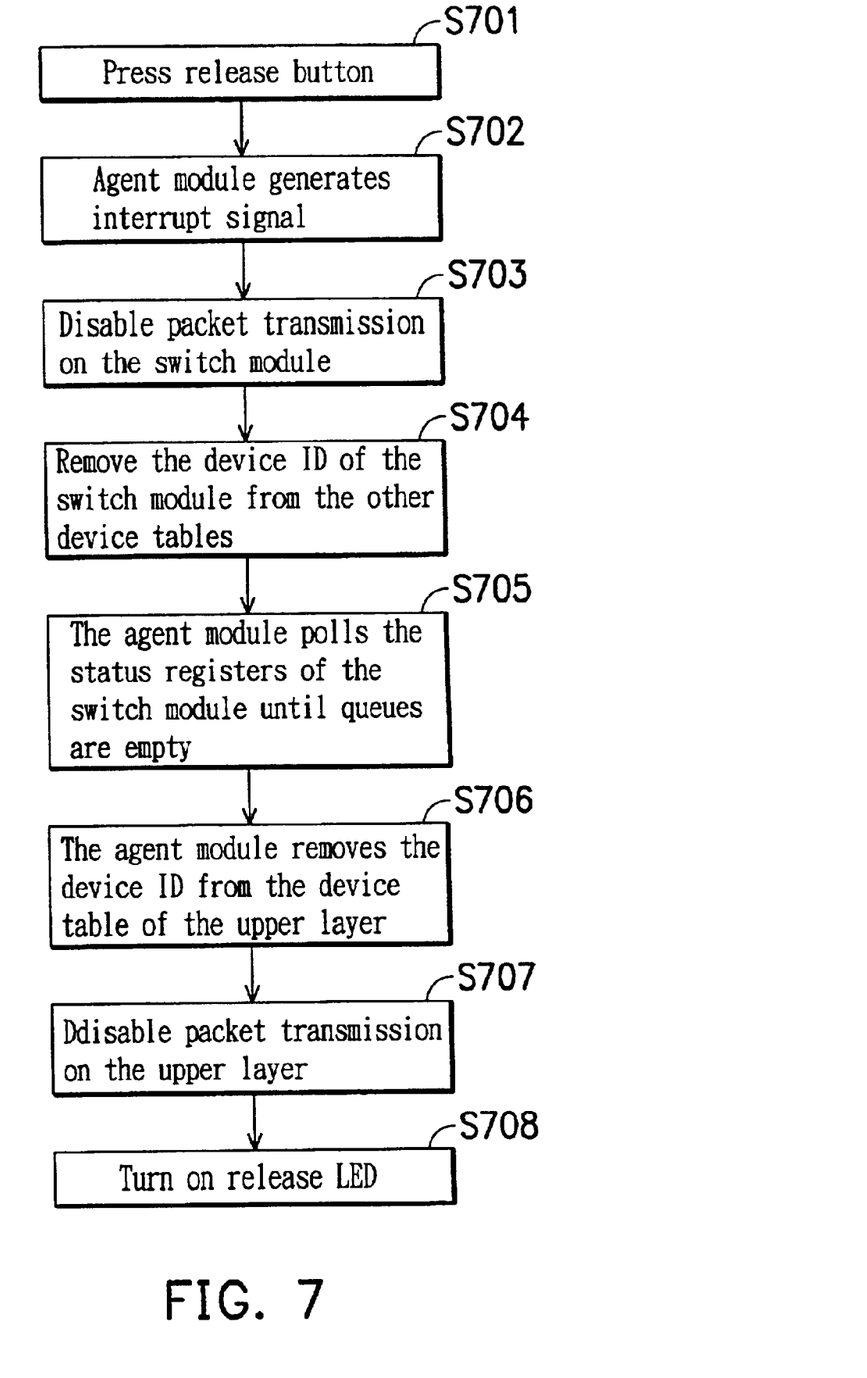
FIG. 7 shows the flow chart of a hot removal of the switch.

FIG. 7 shows the flow chart of a hot removal of the switch. In step S701, a release button 16 is pressed and a hardwired signal is passed to the CPU 101. In step S702, the CPU 101 generates an interrupt signal.

Figure 8A:
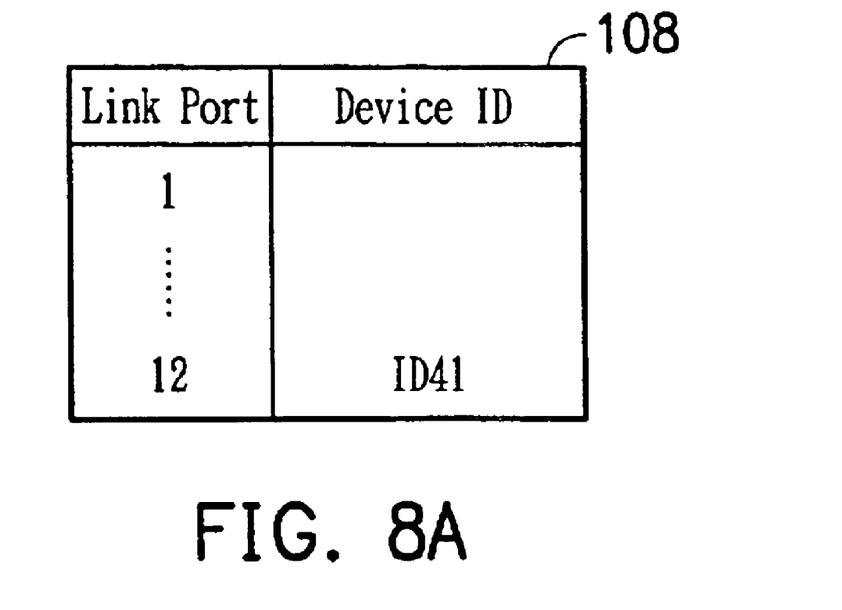
FIGS. 8A–8B shows the link table of removing the switch module.

In step S703, the CPU 11 co-works with the CPU 101 to disable packet transmission on the GT module 22 and the GT module 23. In step S704, the CPU 31 receives commands from the CPU 101 to remove the ID of the GT module 22 and the ID of the GT module 23 from the device table of the GT module 41. The device table of the GT module 41 is shown in FIG. 8A. In step S705, the CPU 101 polls the registers in the GT module 22 and the register in the GT module 23 until queues are empty, i.e., no packets wait for transmission.

Figure 8B:
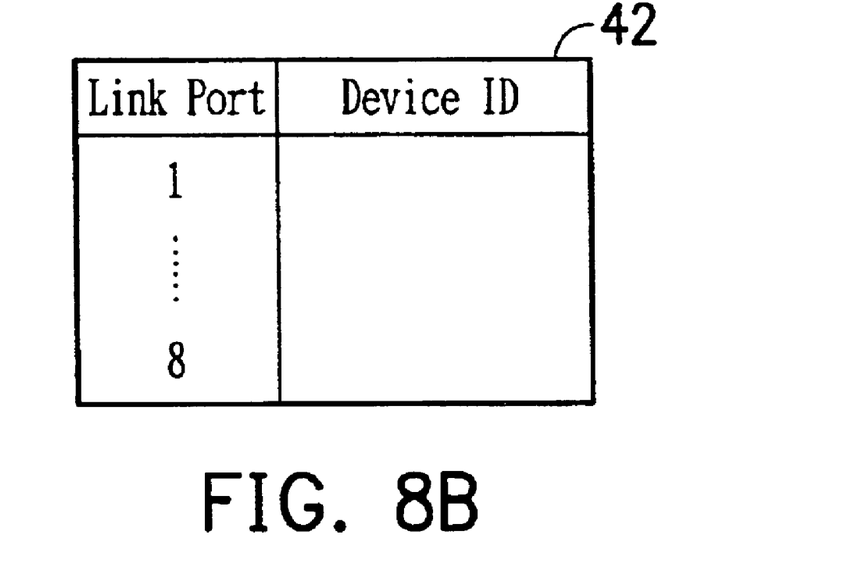

In step S706, the CPU 101 removes the ID of the GT module 22 and the ID of the GT module 23 from the device table of the GT module 110. The device table of the GT module 110 is shown in FIG. 8B. The CPU 11 receives commands from the CPU 101 to remove the ID of the GT module 22 and the ID of the GT module 23 from the device table of the GT module 21. In step S707, the CPU 101 disables packet transmission on the link port of the GT module 21. In step S708, a LED 19 is turned on to inform that the switch module is allowed to remove.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A hot swap method for a computer system, which includes plural slots and a first circuit module including a first link module coupled to the plural slots, comprising:

inserting a second circuit module having a second link module to one of the plural slots;

generating an interrupt signal such that the first circuit module delivers a reset signal to initialize the second circuit module;

generating a first link table in the first circuit module for recording an identification number of the second circuit module and identification numbers of modules coupling to the first link module; and generating a second link table in the second circuit module for recording identification numbers of the modules coupling to the second link module.

2. The hot swap method for the computer system claimed in claim 1, wherein the computer system is a switch.

3. The hot swap method for the computer system claimed in claim 1, wherein the first circuit module is an agent module.

4. The hot swap method for the computer system claimed in claim 1, the second circuit module is a switch module.

5. The hot swap method for the computer system claimed in claim 1, wherein the method for generating the first link table is topology discovery process.

6. The hot swap method for the computer system claimed in claim 1, further comprising the steps of:

pressing a release button of the second circuit module, whereby an interrupt signal is generated by the first circuit module;

the first circuit module disabling communication functions of the second circuit module;

the first circuit module detecting that data of the second circuit module is completely transmitted;

removing the identification number of the second circuit module from the first link table; and turning on an LED of the second circuit module.

7. The hot swap method for a computer system claimed in claim 1, further comprising the steps of:

inserting a third circuit module having a third link module into one of the plural slots;

generating a third link table in the third circuit module for recording the identification number of the second circuit module.

8. The hot swap method for a computer system claimed in claim 7, further comprising the steps of:

pressing a release button of the second circuit module, whereby an interrupt signal is generated by the first circuit module;

the first circuit module disabling communication functions of the second circuit module;

removing the identification number of the second circuit module from the third link table;

the first circuit module detecting that data of the second circuit module is completely transmitted;

removing the identification number of the second circuit module from the first link table;

turning on an LED of the second circuit module.

9. A hot swap method for a computer system, which includes plural slots and a first circuit module including a first link module coupled to one of the plural slots and a third circuit module including a third link module coupled to one of the plural slots, comprising:

inserting a second circuit module to one of the plural slots, such that an interrupt signal is triggered in the first circuit module, wherein the second circuit module comprises a second link module for module management, and a forth link module coupled to the second link module for interfacing with external modules;

generating a reset signal in response to the interrupt signal to initialize the second circuit module;

generating a first link table in the first circuit module for recording an identification number of the fourth link module and identification numbers of modules coupling to the first link module;

generating a second link table in the second circuit module for recording an identification number of the fourth link module and identification numbers of modules coupling to the second link module; and generating a third link table in the third circuit module for recording an identification number of the fourth link module and identification numbers of modules coupling to the third link module.

10. The hot swap method for a computer system claimed in claim 9, wherein the second circuit module comprises a release button, and the method further comprising the steps of:

pressing the release button such that an interrupt signal is triggered in the first circuit module;

the first circuit module disabling communication functions of the fourth circuit module in response to the interrupt signal;

removing the identification number of the fourth link module from the third link table;

the first circuit module detecting that data of the fourth link module is completely transmitted;

removing the identification number of the fourth link module from the first link table and from the second link table;

the first circuit module disabling communication function of the fourth link module; and turning on an LED of the second circuit module.

11. The hot swap method for a computer system claimed in claim 9, wherein the computer system is a switch.

12. The hot swap method for a computer system claimed in claim 9, wherein the first circuit module is an agent module.

13. The hot swap method for a computer system claimed in claim 9, the second circuit module is a switch module.

14. The hot swap method for a computer system claimed in claim 9, wherein the method for generating the first link table is topology discovery process.

* * * * *